US007606004B2

United States Patent
Tsuda et al.

(10) Patent No.: US 7,606,004 B2
(45) Date of Patent: Oct. 20, 2009

(54) ROTATING DISK STORAGE DEVICE WITH ACTUATOR LOCK MECHANISM

(75) Inventors: Shingo Tsuda, Kanagawa (JP); Matsuro Ohta, Kanagawa (JP); Kazutaka Okasaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 618 days.

(21) Appl. No.: 11/142,065

(22) Filed: May 31, 2005

(65) Prior Publication Data

US 2005/0264941 A1     Dec. 1, 2005

(30) Foreign Application Priority Data

Jun. 1, 2004   (JP) .............................. 2004-163536

(51) Int. Cl.
*G11B 5/54*   (2006.01)
(52) U.S. Cl. .................................. 360/256.2; 360/256.3
(58) Field of Classification Search ................. 360/256, 360/256.3, 265.1, 256.2
See application file for complete search history.

(56) References Cited

U.S. PATENT DOCUMENTS 5,303,101 A * 4/1994 Hatch et al. ................. 360/256
5,880,904 A * 3/1999 Mizoshita et al. ......... 360/97.01
6,462,913 B1 * 10/2002 Chew ....................... 360/256.2
2005/0117258 A1 * 6/2005 Ohta et al. ............... 360/256.2

FOREIGN PATENT DOCUMENTS

| JP | 10-302417 | 11/1998 |
| JP | 2004303290 A | * 10/2004 |
| JP | 2005085441 A | * 3/2005 |

* cited by examiner

*Primary Examiner*—Brian E Miller
(74) *Attorney, Agent, or Firm*—Townsend and Townsend and Crew LLP; John Henkhaus

(57) ABSTRACT

Embodiments of the invention permit a magnet-based actuator lock mechanism to operate smoothly in a magnetic disk drive that uses a base made of a magnetic material. In one embodiment, the base to be used is made of a magnetic material. The actuator lock mechanism includes a rotatable arm that retains a magnet. A magnetic attraction force, which is oriented toward the base as indicated by an arrow, is generated in the magnet. The base is provided with a cut to reduce the attraction force. The cut is covered with a sealing material to maintain internal airtightness. The actuator lock mechanism may be, for instance, an eddy-current latch, inertia latch, or magnetic latch.

12 Claims, 11 Drawing Sheets

(A)

(B)

(C)

(D)

PRIOR ART

PRIOR ART

PRIOR ART

PRIOR ART

PRIOR ART

PRIOR ART

PRIOR ART

PRIOR ART

PRIOR ART

US 7,606,004 B2

ROTATING DISK STORAGE DEVICE WITH ACTUATOR LOCK MECHANISM

CROSS-REFERENCES TO RELATED APPLICATIONS

This application claims priority from Japanese Patent Application No. JP2004-163536, filed Jun. 1, 2004, the entire disclosure of which is incorporated herein by reference.

BACKGROUND OF THE INVENTION

The present invention relates to a rotating disk storage device that is equipped with a magnet-based actuator lock mechanism, and more particularly to a rotating disk storage device that comprises a ferromagnetic base or cover and an actuator lock mechanism whose operation remains unaffected by the magnetic attraction force of a magnet.

In recent years, a steel sheet is pressed to form a magnetic disk drive base on which a magnetic disk, actuator, and other components are mounted. This method is used in replacement of an aluminum die casting method. Further, magnetic disk drives are equipped with an actuator lock mechanism, which retains an actuator in such a manner that a head retreats to a predetermined position to prevent it from moving into the recording surface of a magnetic disk while magnetic disk rotation is stopped. A typical actuator lock mechanism is disclosed, for instance, in Japanese Patent Laid-Open No. 302417/1998 (Patent Document 1).

As described in Patent Document 1, some actuator lock mechanisms are equipped with a movable member that retains a magnet. The movable member functions as a part of an actuator lock mechanism as it performs a rotary or linear operation by making use of a magnetic attraction force exerted between a magnet and an iron strip or a magnetic attraction force or magnetic repulsive force exerted between magnets. Since the size of a magnetic disk drive is decreased, the movable member and the magnet to be retained by the movable member are forced to become smaller in size. Therefore, it is impossible to considerably increase the force that the magnet exerts on the movable member. Consequently, it is demanded that the bearing and other parts of the movable member smoothly operate even when a small force is exerted. However, if the base or cover is made of a magnetically attractive material, a magnetic attraction force is exerted between the magnet and base or cover in addition to the magnetic attraction force or magnetic repulsive force to be exerted for the proper operation of the movable member.

The magnetic attraction force exerted between the magnet and base or cover interferes with the smooth operation of the movable member and may obstruct the normal operation of a latch mechanism. Therefore, it is a feature of the present invention to provide a smooth operation of a magnet-based actuator lock mechanism in a rotating disk storage device that has a base or cover containing a magnetically attractive magnetic section.

FIG. 1 is a perspective view of a typical magnetic disk drive 10. The magnetic disk drive 10 includes a base 11. The base 11 houses various elements, including a magnetic disk 13, which is a rotating disk recording medium, an actuator head suspension assembly (hereinafter referred to as the AHSA) 15, which carries a head 12 for performing both a data read operation and a data write operation or performing either a data read operation or a data write operation, a ramp 14, and a voice coil yoke 21, which composes a voice coil motor. The AHSA 15 includes an actuator assembly 16, a suspension assembly 18, and a head 12. The actuator assembly 16 comprises an actuator arm, a pivot bearing housing, a coil support, and a voice coil. The magnetic disk 13 is driven by a spindle motor to rotate rapidly on a spindle shaft 19. The AHSA 15 is driven by a voice coil motor to pivot on a pivot shaft 17. An upper yoke 21 constitutes a magnetic path for providing the voice coil with a magnetic field.

A cover is installed over a flange section 11a of the base 11 in order to provide the interior with an enclosed space that is in a clean air environment. The base, the AHSA 15, which is housed by the base, the elements such as the magnetic disk 13, and the cover constitute a head disk assembly (HDA). A circuit board is mounted on the outside of the base 11 in order to exercise control over magnetic disk drive operations and data read/write operations. The base 11 is formed by pressing, for instance, a cold rolled steel sheet (SPCE), which is entirely a ferromagnetic material. Further, the present embodiment may comprise a cover that is formed by a ferromagnetic material. The magnetic disk drive 10 is provided with an eddy-current latch 24 for illustrative purposes. However, the eddy-current latch 24 of the present embodiment may be replaced by an inertia latch, magnetic latch, or other similar actuator lock mechanism.

Eddy-Current Latch

An embodiment of an eddy-current latch, which is used as an actuator lock mechanism according to an embodiment of the present invention, will now be described with reference to FIGS. 3, 4, 5(A) and 5(B). The eddy-current latch shown in FIGS. 3, 4, 5(A) and 5(B) is disclosed in Japanese Patent Laid-Open No. 91546/2003. FIG. 3 illustrates a magnetic disk drive 200 and shows an AHSA 201 that is placed in a retreat position when a merge lip engages with a ramp 208 and is restrained by a latch member 203. The latch member 203 corresponds to the movable member 100, which has been described with reference to FIGS. 2(A) through 2(D), and retains an eddy-current magnet 227. A magnetic disk 207 is made of a conductive material and provided with a non-recording area 207a and a recording area 207b on which a magnetic layer is formed. The AHSA 201 is driven by a voice coil motor to pivot on a pivot shaft 209 and place a head/slider at a specific position over the surface of the magnetic disk 207. An engagement section 205 is formed on a leading end of a coil support 213, which retains a voice coil 215. The engagement section 205 is restrained by the latch member 203 so that the head/slider cannot rotate to move toward the surface of the magnetic disk 207 even when an extraneous impact is applied to the magnetic disk drive 200. An upper yoke 211 constitutes a magnetic path for providing the voice coil 215 with a magnetic field.

FIG. 4 presents top and bottom perspective views of the latch member 203. The latch member 203 is made of a plastic or other nonmagnetic material. It comprises a latch arm 223, which has a shaft hole 221 at the center, a magnet holder 225, which is mounted on one end of the latch arm 223, and a latch engagement section 229, which is formed on the other end of the latch arm 223. A latch shaft 217, which rises perpendicularly from the bottom surface of a base 202, penetrates through the shaft hole 221 at the center so that the latch member 203 turns on the latch shaft 217 (see FIGS. 5A and 5B).

The magnet holder 225 retains the eddy-current magnet 227. The lower magnetic pole surface of the eddy-current magnet 227 is positioned to face the surface of the magnetic disk 207 while the latch member 203 is mounted in the magnetic disk drive 200. A magnetic flux emitted from the magnetic pole of the eddy-current magnet 227 penetrates through the magnetic disk 207. The eddy-current magnet 227 may be an electromagnet. However, it is preferred that a permanent magnet be used for increased structural simplicity.

The magnetic pole for the eddy-current magnet 227 need not be a powerful magnet. Therefore, even when the magnetic pole is positioned to face any location within the non-recording area 207a or recording area 207b on the surface of the magnetic disk 207, a necessary eddy current for the operation of the latch member 203 can be supplied without affecting stored data. Although the intended purpose is achieved without regard to the magnetic pole position over the magnetic disk 207, the magnetic pole is positioned to face the non-recording area 207a, which is circularly positioned near the outer boundary of the magnetic disk 207 for increased safety assurance.

The present embodiment assumes that the distance between the surface of the magnetic disk 207 and the magnetic pole of the eddy-current magnet 227, which faces the magnetic disk 207, is 0.7 mm, and selects a magnetic field strength of the eddy-current magnet 227 so as to obtain a magnetic flux density of 2150 gauss (0.215 Wb/m2) on the magnetic disk surface that is directly under the magnetic pole. It is confirmed that the combination of the above magnetic field strength and the coercive force (3750 O e) of the magnetic disk 207 does not affect data recordings even when the eddy-current magnet 227 is positioned over the recording area 207b. However, if the eddy-current magnet 227 is positioned over the non-recording area 207a, it is not necessary to consider the coercive force of the magnetic disk 207 or the magnetic field strength provided by the eddy-current magnet 227. Further, a large eddy current can be obtained for best results because the peripheral velocity of the magnetic disk 207 is highest in the non-recording area 207a.

The eddy-current magnet 227 is mounted on the magnet holder 225 with the magnetic pole polarity associated with the voice coil magnet's magnetic pole polarity in order to use the eddy-current magnet 227 also as a bias structure by making use of a force exerted between the eddy-current magnet 227 and a voice coil magnet. When the AHSA 201 is in a retreat position, the bias structure imparts a torque for causing the latch member 203 to turn until it reaches the restraint region, that is, a torque for rotating the latch member 203 in the direction of arrow X in FIG. 3.

As regards the voice coil magnet mounted on the lower surface of the upper yoke 211, the side toward the eddy-current magnet is set as the N pole. As regards the voice coil magnet mounted on the upper surface of the lower yoke, the side toward the eddy-current magnet is set as the S pole. Therefore, the upper magnetic pole of the eddy-current magnet 227 is set as the N pole, whereas the magnetic pole facing the surface of the magnetic disk 207 is set as the S pole. As a result, the eddy-current magnet 227 receives a repulsive force from the voice coil magnet and imparts a bias force, which is an X-direction torque, to the latch member 203.

When the above configuration is employed, the latch member 203 can restrain the AHSA 201, which is in a retreat position. More specifically, the latch engagement section 229 engages with the engagement section 205, which is provided for a part of the coil support 213, when the AHSA 201 is in a retreat position. As a result, the head/slider is blocked from moving toward the magnetic disk when, for instance, an extraneous impact is applied. The engagement section 205 need not always be provided for a part of the coil support 213. It may alternatively be positioned at a certain place within the AHSA 201. Further, a bias magnet may be embedded in a predetermined location 231 of the latch arm 223 in order to obtain a bias force, and an attraction force exerted between the bias magnet and voice coil magnet may be used.

The operation of the actuator lock mechanism, which is configured as described above, will now be described with reference to FIGS. 5(A) and 5(B). FIG. 5(A) shows a state in which the magnetic disk 207 has stopped rotating and the AHSA 201 has retracted the head/slider to the ramp 208 (see FIG. 3). If the head/slider moves away from the magnetic disk when an extraneous impact is applied to the magnetic disk drive 200 while the AHSA 201 is in a retreat position, a stopper or other well-known scheme is used to prevent the AHSA 201 from rotating beyond the retreat position.

In a state shown in FIG. 5(A), the latch member 203 receives an X-direction force and rotates on the latch shaft 217 due to the repulsive force exerted between the voice coil magnet and eddy-current magnet 227, that is, the bias force, and the latch arm 223 is brought into contact with point P of the base 202 and stopped. The latch member 203 is positioned within a restraint range so that the engagement section 205, which is formed at the leading end of the coil support 213, engages with the latch engagement section 229, causing the AHSA 201 to restrain the head/slider from rotating toward the magnetic disk 207. The restraint range is a range over which the latch member 203 can cause the latch engagement section 229 to restrain the AHSA's engagement section 205. The restraint range is reached before the latch member 203 comes into contact with point P of the base 202.

Therefore, while the AHSA 201 is in a retreat position with the latch member 203 positioned within the restraint range, the latch member 203 secures the AHSA 201 to the base 202 even when a considerable extraneous impact is applied to the magnetic disk drive 200. As such being the case, the head/slider does not move to the surface of the magnetic disk 207 to damage the magnetic disk 207 or incur stiction. The operation performed when the magnetic disk 207 rotates will now be described with reference to FIG. 5(B). When the magnetic disk 207 is to be rotated to perform a data read/write operation, it is necessary that the latch member 203 release the AHSA 201.

When the magnetic disk 207 rotates in direction Z in the state shown in FIG. 5(A), the relative motion between the magnetic flux emitted from the eddy-current magnet 227 and the magnetic disk 207, which is made of a conductor, causes an induced current, called an eddy current, to flow to the magnetic disk in compliance with Fleming's right-hand rule. Since the eddy current exists in a magnetic field of the eddy-current magnet 227, a force is subsequently exerted between the magnetic disk 207 and eddy-current magnet 227 in compliance with Fleming's left-hand rule. As a result, a force is exerted on the eddy-current magnet 227. This exerted force is oriented in direction Y, which is the same as the rotation direction of the magnetic disk 207.

The force exerted by the eddy current depends, for instance, on the magnetic field strength of the eddy-current magnet 227, the interval between the eddy-current magnet 227 and magnetic disk 207, the electrical properties of the magnetic disk 207, and the peripheral velocity of the magnetic disk 207, which rotates. However, an eddy current selection is made so that the bias force is exceeded. Therefore, the higher the rotation speed of the magnetic disk 207 becomes, the greater the force that is exerted on the latch member 203 and oriented in direction Y becomes. Eventually, the latch member 203 rotates on the latch shaft 217 until it reaches a release range shown in FIG. 5(B). Finally, the latch arm 223 comes into contact with point Q on a side wall of the base 202 and stops. This principle is well known as the principle of Arago's disk.

The latch engagement section 229 of the latch member 203, which is in the release range shown in FIG. 5(B), is no longer engaged with the AHSA's engagement section 205, which is formed by the coil support 213. The AHSA 201 is released from the latch member 203 and can rotate the head/slider to move it toward the magnetic disk 207. In the present embodiment, the release range of the latch member 203 is reached before the latch arm 223 comes into contact with point Q on the side wall of the housing.

To stop the rotation of the magnetic disk 207, the head/slider is first retracted to the ramp 208 with the AHSA 201 positioned as shown in FIG. 3. While the magnetic disk 207 rotates, a force that is greater than the bias force in direction X and is oriented in direction Y is exerted on the latch member 203. However, when the magnetic disk rotation speed lowers, the bias force oriented in direction X is eventually greater than the force oriented in direction Y. The latch member 203 then turns to move toward the restraint range. Finally, the latch member 203 comes into contact with point P on the side wall of the base 202 and stops. In this instance, the latch engagement section 229 engages with the AHSA's engagement section 205 to restrain the AHSA 201.

The eddy-current latch according to embodiments of the present invention can provide timing adjustments so that the time for releasing the AHSA 201 coincides with the time for rotating the magnetic disk 207, which requires the AHSA 201 to operate freely. The mechanism for restraint and release is established with a simple structure that requires no other special mechanical hardware. Further, the eddy-current magnet 227 is positioned outside the magnetic disk, which can attain a high peripheral velocity. Therefore, the eddy-current magnet 227 required for obtaining a torque for rotating the latch member 203 against the bias force can be reduced in size. Consequently, the internal space within the base, which is required for latch structure formation, can be rendered small.

When the base 202 or the cover installed over the base is made of steel or other ferromagnetic material, the eddy-current magnet 227 may receive an attraction force that is oriented toward the base 202 or cover, impart a downward or upward being moment to the latch member 203, inhibit the slide bearing function of the shaft hole 221 and latch shaft 217 from being properly exercised, and cause the latch member 203 to operate improperly.

Inertia Latch

An embodiment of an inertia latch, which is used as an actuator lock mechanism according to another embodiment of the present invention, will now be described with reference to FIGS. 6 through 9. The inertia latch shown in FIGS. 6 through 9 is disclosed in Japanese Patent Laid-Open No. 320078/2003. FIG. 6 is an exploded perspective view of the inertia latch. The inertia latch mainly comprises an inertia member 327, a latch member 345, an outer crash stop 313, and a coil support 315. The latch member 345 corresponds to the movable member 100, which is described with reference to FIGS. 2(A) through 2(D), and has a magnet 361.

A voice coil 307 is entirely surrounded by the coil support 315, which is a part of the AHSA 305 (only the rear of the AHSA is shown). Two arms composing the coil support 315 extend rearward from a section near a pivot cartridge insertion area. One arm is provided with a first abutment 317, which imparts a torque to the inertia member 327, and a second abutment 319, which abuts on the outer crash stop 313. The other arm is provided with a third abutment 321, which abuts on an inner crash stop 311.

A magnetic metal strip is attached to the second abutment 319 in such a manner that it can be attracted by a magnet embedded in an elastic body of the outer crash stop 313. The two arms are bent and interconnected with each other behind the AHSA 305. A first slave engagement section 323 and a second slave engagement section 325 are formed at the arm connection. These slave engagement sections are cut and formed so as to become angularly open in a turning direction indicated by arrow B1.

The inertia member 327 comprises a long arm section 331 and a wide balancer section 329, which are on either side of a hole into which a turning shaft 343 is inserted. The inertia member 327 is supported in such a manner that it can turn on the turning shaft 343, which is mounted upright in the base 303. The inertia member 327 absorbs the impact energy of the AHSA 305 as kinetic energy. The inertia member 327 is made of metal or other relatively heavy material so that a great moment of inertia can be obtained. Further, the employed material is nonmagnetic so that the inertia member 327 remains unaffected by a magnetic field generated from the voice coil yoke. The inertia member 327 is formed so that the center of gravity of the arm section 331 and balancer section 329 is at the turning shaft 343.

Therefore, the inertia member 327 turns if the magnetic disk drive 300 moves in a direction of rotating around the turning shaft 343 and then suddenly stops or otherwise applies an impact. However, the inertia member 327 does not turn if an impact is applied while the magnetic disk drive 300 does not move in a direction of rotating around the turning shaft 343. A first abutment 333 is provided on a lateral surface of the arm section 331 that is positioned on the side toward the coil support 315. A second abutment 335 is provided on a lateral surface of the arm section 331 that is positioned on the side away from the coil support 315. These abutments are in contact with the latch member 345.

A mounting surface 337 is provided around the turning shaft of the inertia member 327. An auxiliary member 339 is secured to the mounting surface 337 with a boss 338 inserted into a central hole. The auxiliary member 339 and inertia member 327 turn on the turning shaft 343 in an integrated manner. The auxiliary member 339 is provided with an abutment 341 that abuts on the first abutment 317 of the coil support 315. The auxiliary member 339 conveys to the inertia member 327 the collision energy that arises when the coil support 315 collides with the outer crash stop 313. In an alternative configuration without the auxiliary member 339, the inertia member 327 may directly abut on the coil support.

The latch member 345 comprises an arm section 349 and a balancer section 347, which are on either side of a hole into which a turning shaft 359 is inserted. The latch member 345 is supported in such a manner that it can turn on the turning shaft 359, which is mounted upright in the base 303. The employed configuration is such that the latch member 345 has approximately 1/80 the inertia moment of the inertia member 327. The latch member 345 is made, for instance, of plastic or other relatively light, nonmagnetic material that will not be affected by the magnetic field generated from voice coil yoke. Regardless of the present embodiment, an alternative configuration may be employed so that the latch member 345 has no more than approximately 1/10 the inertia moment of the inertia member 327.

The latch member 345 is formed so that the center of gravity of the arm section 349 and balancer section 347 is at the turning shaft 359. Therefore, the latch member 345 rotates if an impact is applied in a direction in which the magnetic disk drive 300 rotates around the turning shaft 359. However, the latch member 345 does not rotate if an impact is applied in a direction in which the magnetic disk drive 300 does not rotate around the turning shaft 359. A wedge-shaped engagement section 351 is formed on the leading end of the arm section 349. This wedge-shaped engagement section 351 can engage with the first slave engagement section 323 or second slave engagement section 325 of the coil support 315. A first abutment pin 353 is protruded from the underside of the arm section 349, and can abut on the first abutment 333 of the inertia member 327. A second abutment pin 357 is protruded from the underside of the balancer section 347, and can abut on the second abutment 335 of the inertia member 327.

A lateral surface of the arm section 349 is provided with an abutment 355, which abuts on a wall of the base 303. The magnet 361 is embedded in the balancer section 347. The magnet 361 is configured so as to impart a bias force for attracting an iron strip provided for a part of the coil support 315 and rotating the latch member in the direction of arrow B3 when the coil support 315 moves nearby. FIG. 6 also shows the outer crash stop 313 and inner crash stop 311, which each contain a cylindrical elastic body and are mounted upright in the base. A magnetic path to the voice coil 307 is formed, for instance, by a voice coil yoke 309 and a voice coil magnet (not shown). The operation of the inertia latch, which is configured as described above, will now be described with reference to FIGS. 7 and 8.

FIG. 7 shows that the AHSA 305 gets out of control, rotates in the direction of arrow A1 at a speed higher than normal, and collides with the outer crash stop 313. As regards the latch member 345, the magnet 361 attracts the iron strip of the coil support 315 and rotates in the direction of arrow B3, and the abutment 355 is brought into contact with a side wall 303a of the base 303 and stopped. There is a slight gap between the first abutment pin 353 and first abutment 333 and/or between the second abutment pin 357 and second abutment 335.

When the latch member 345 rotates in the direction of arrow B3, the first abutment pin 353 abuts on the first abutment 333 of the inertia member 327 and rotates the inertia member 327 in the direction of arrow A2. As the inertia member 327 rotates in the direction of arrow A2, the second abutment 335 of the inertia member 327 approaches the second abutment pin 357 of the latch member 345. Therefore, if the abutment 355 of the latch member 345 abuts on the side wall 303a of the base 303 before the second abutment pin 357 abuts on the second abutment section 335, the inertia member 327 can freely turn within a gap between the second abutment pin 357 and the second abutment 335.

In the resulting state, it is said that the inertia member 327 and latch member 345 are in their respective home positions. When the AHSA 305 performs a normal unloading operation, the second abutment 319 of the coil support 315 abuts on the outer crash stop 313 so that the elastic body slightly bends. The collision energy of the AHSA 305 is consumed for elastic body compression, and the AHSA 305 receives a weak repulsive force from the elastic body. Therefore, the merge lip on the leading end of the AHSA 305 stops at the home position, which is on the ramp's flat surface. In this instance, the AHSA 305 merely operates. The inertia member 327 and latch member 345 do not rotate away from their home positions.

If the AHSA 305 collides with the outer crash stop 313 at a high speed when the AHSA 305 gets out of control or a power failure suddenly occurs, the elastic body of the outer crash stop 313 first bends to absorb and attenuate the collision energy. Further, if the AHSA 305 continuously rotates in the direction of arrow A1 while subjecting the outer crash stop 313 to elastic deformation, the first abutment 317 of the coil support 315 abuts on the abutment 341 of the auxiliary member 339, thereby rotating the inertia member 327 in the direction of arrow B2.

If there is a gap between the first abutment 333 of the inertia member 327 and the first abutment pin 353 of the latch member 345 while the inertia member 327 and latch member 345 are in their home positions, only the inertia member 327 rotates in the direction of arrow B2 at first. When the first abutment 333 abuts on the first abutment pin 353 later, the latch member 345 rotates in the direction of arrow A3 because the inertia member 327 imparts a torque to the latch member 345. In the resulting state, the collision energy for the collision of the AHSA 305 with the outer crash stop 313 is consumed by the energy for subjecting the elastic body to elastic deformation, the energy for rotating the inertia member 327, which has a relatively great moment of inertia in addition to a friction force that the merge lip receives from the flat surface of the ramp, and the energy for rotating the latch member 345, which has a relatively small moment of inertia. Therefore, the impact can be attenuated to a greater extent than in a case where only the outer crash stop 313 is used for impact absorption. In other words, the impact absorption capacity of the inertia latch is larger by the amount of energy for rotating the inertia member 327 and latch member 345 than in a case where only the outer crash stop 313 is used.

When the AHSA 305 consumes the entire energy for rotation in the direction of arrow A1 at this time, the energy for subsequently rotating the AHSA 305 in the direction of B1 with the repulsive force of the outer crash stop 313 is small. Therefore, the AHSA 305 can stop at the home position as the abutment 319 of the coil support 315 is attracted by a magnet embedded in the elastic body of the outer crash stop 313. Subsequently, the latch member 345 rotates in the direction of arrow B3 due to attraction between the magnet 361 and the iron strip provided for the coil support 315. The latch member 345 and inertia member 327 then both return to their home positions and do not restrain the operation of the AHSA 305.

As described above, the rotation energy of the inertia member 327 or the rotation energy of the inertia member 327 and latch member 345 is added to the compression energy of the outer crash stop 313. This increases the amount of attenuation of the collision energy of the AHSA 305. Therefore, even when an unprecedentedly strong impact is applied, the AHSA 305 can be stopped at the home position without having to perform a latch operation. The latch operation properly stops the AHSA 305 at the home position. However, it applies a significant impact to the AHSA 305. It is therefore preferred that the AHSA 305 be retracted to the home position without being latched.

When the AHSA 305 rapidly rotates in the direction of arrow A1 and the rotation energy is great, the AHSA 305 collides with the outer crash stop 313, and then continues to rotate in the direction of arrow A1 while deforming the elastic body. The inertia member 327 receives a torque from the AHSA 305, rotates in the direction of arrow B2, imparts a torque to the latch member 345 to rotate it in the direction of arrow A3, and moves the engagement section 351 of the latch member 345 to the latch position. The latch position refers to the positioning of the inertia member 327, latch member 345, and AHSA 305 for permitting the engagement section 351 of the latch member 345 to engage with the first slave engagement section 323 or second slave engagement section 325 formed on the coil support 315.

If the collision energy of the AHSA 305 cannot be entirely absorbed by the compression of the elastic body of the outer crash stop 313, the rotation energy of the inertia member 327 and latch member 345, and the force of friction between the merge lip and ramp flat surface, the AHSA 305 rebounds and rotates in the direction of arrow B1 in reaction to a compression limit that is reached by the elastic body of the outer crash stop 313. However, when the AHSA 305 rebounds and collides with the outer crash stop 313, causing the head/slider to reach the recording surface of the magnetic disk 301, the inertia member 327 receives a torque from the AHSA 305 via the abutment 341 of the auxiliary member 339 in accordance with the degree of elastic body bending, and rotates in the direction of arrow B2.

Further, the first abutment pin 353 receives a torque from the first abutment 333 of the inertia member 327, causing the latch member 345 to rotate in the direction of arrow A3. Since the engagement section 351 has reached the latch position, the first slave engagement section 323 of the coil support 315 for the AHSA 305, which has rebounded, is restrained by the engagement section 351 of the latch member 345. Therefore, the coil support 315 does not turn in the direction of arrow B1 beyond the latch position. This state is shown in FIG. 8.

The angular setting for the movement of the inertia member 327 for rotating the latch member 345 from the home position to the latch position is smaller than the angle of rotation of the AHSA 305, which rebounds and rotates to reach the latch position. Therefore, if it is assumed that the AHSA 305, inertia member 327, and latch member 345 rotate at the same angular velocity, the latch member 345 reaches the latch position before the AHSA 305 rebounds to reach the latch position. Thus, the first slave engagement section 323 of the coil support can be properly restrained. If the engagement section 351 of the latch member 345 reaches the latch position with a delay so that the first slave engagement section 323 cannot be restrained, the second slave engagement section 325, which reaches the latch position later than the first slave engagement section 323, is restrained.

The coil support 315, which is latched by the engagement section 351 of the latch member 345, may rotate again in the direction of arrow A1 in reaction to such a latch. However, the kinetic energy of the AHSA 305 is attenuated. Therefore, even if the AHSA 305 collides again with the outer crash stop 313, the remaining energy is not enough for the AHSA 305 to rebound, causing the head/slider to reach the recording surface. Consequently, the AHSA 305 stops at the home position or at a place near the home position due, for instance, to the energy absorption by the elastic deformation of the outer crash stop 313, the absorption of the rotation energy of the inertia member 327 and latch member 345, the attraction by a magnet embedded in the outer crash stop 313, and the force of friction between the merge lip and ramp flat surface.

If the coil support 315 rebounds at the time of a repeated collision with the outer crash stop 313 because the remaining energy is not sufficiently attenuated, the link mechanism between the inertia member 327 and latch member 345 performs a cooperative action to accomplish a restraint again. The elastic force of the elastic body of the outer crash stop 313 can be lessened without rotating the inertia member 327 when the AHSA 305 retreats for a normal unloading operation. If the applied impact is considerably great, a selection is made so as to rotate the inertia member 327 or the inertia member 327 and latch member 345.

The inertia latch operation performed when the AHSA 305 rotates in the direction of arrow A1 due to extraneous impact application to the magnetic disk drive 300 will now be described. Unlike the operation performed when the above-described out-of-control situation arises, the inertia latch operation is such that an impact-induced torque is applied to the inertia member 327 and latch member 345 in order to rotate them away from their home positions. For the impact to be applied to the magnetic disk drive 300, there are various parameters, including those indicating the strength, direction, rotation, and rotation center. When extraneously impacted, the AHSA 305, inertia member 327, and latch member 345 behave in a complex manner. The AHSA 305 is configured so that its center of gravity is at the pivot shaft. Therefore, when the AHSA 305 rotates, it is conceivable that the magnetic disk drive 300 is impacted in the direction of rotation around the pivot shaft or an axis near the pivot shaft.

The above-mentioned impact can be simulated in a situation where the magnetic disk drive 300 is supported with a testing apparatus to permit rotation around the pivot shaft of the AHSA 305, rotated in the direction of arrow A1, and caused to collide against a fixed object in order to bring the rotation to a sudden stop. The component parts housed in the magnetic disk drive 300 suddenly stop their movement in the direction of arrow A1 upon collision except those which are retained for free motion. However, the AHSA 305, inertia member 327, and latch member 345 continue their movement by means of inertia.

The turning shaft 343 of the inertia member 327 and the turning shaft 359 of the latch member 345 are positioned close to the pivot shaft. It is therefore conceivable that the AHSA 305, inertia member 327, and latch member 345 are subjected to nearly the same angular acceleration when an impact is applied. Upon impact application, the inertia member 327 rotates in the direction of arrow A2 and the latch member 345 rotates in the direction of arrow A3. The first abutment pin 353 and second abutment pin 357 of the latch member 345 do not abut on the first abutment 333 and second abutment 335 of the inertia member 327 at the time of rotation in the direction of arrow A3. Therefore, the engagement section 351 moves to the latch position without being affected by the inertia member 327.

If the AHSA 305 collides at a low speed so that the second abutment 319 of the coil support 315 is in contact with the outer crash stop 313 for a long period of time, the latch member 345 rotates in the direction of arrow B3 and returns to the home position as the magnet 361 of the latch member 345 attracts an iron strip that is provided for the coil support 315. However, if the AHSA 305 collides at a low speed and the collision energy is small, the AHSA 305 stops at the home position or at a place near the home position due, for instance, to the energy absorption by the elastic deformation of the outer crash stop 313, the absorption of the rotation energy of the inertia member 327 and latch member 345, the attraction of the second abutment 319 by the magnet of the outer crash stop 313, and the force of friction between the merge lip and ramp flat surface.

In a situation where the AHSA 305 collides with the outer crash stop 313 at a high speed, rebounds without being stopped by the outer crash stop 313, and rotates in the direction of arrow B1, the AHSA 305 rebounds and reaches the latch position before the bias force of the magnet 361 causes the latch member 345 to leave the latch position. Therefore, the first slave engagement section 323 or second slave engagement section 325 of the AHSA 305 is restrained by the engagement section 351. However, if no special mechanism is provided, the latch member 345 may leave the latch position before the AHSA 305 rebounds and reaches the latch position so that the latch member 345 does not restrain the AHSA 305.

When the AHSA 305 collides with the outer crash stop 313 while the configuration according to the present embodiment is employed, the abutment 341 of the auxiliary member 339 receives a torque from the first abutment 317 of the coil support 315, causing the latch member 327 to rotate in the direction of arrow B2, whereas the latch member 345 receives a torque from the inertia member 327 and rotates in the direction of arrow A3. Therefore, even if the AHSA 305 rebounds from the outer crash stop 313, the engagement section 351 of the latch member 345 properly restrains the first slave engagement section 323 or second slave engagement section 325 of the coil support 315.

The subsequent description deals with an inertia latch operation that is performed when the AHSA 305 rotates in the direction of arrow B1 in a situation where an extraneous impact is applied to the magnetic disk drive 300 while the AHSA 305 is retracted to the home position. When an extraneous impact is applied to impart a torque to the magnetic disk drive 300 for rotating the AHSA 305 in the direction of arrow B1, it is conceivable that the inertia member 327 and latch member 345 are simultaneously torqued to rotate the inertia member 327 in the direction of arrow B2 and the latch member 345 in the direction of arrow B3.

However, the moment of inertia of the latch member 345 is smaller than that of the inertia member 327. Therefore, the first abutment pin 353 of the latch member 345 abuts on the first abutment 333 of the inertia member 327, and the latch member 345 receives a torque from the inertia member 327 to rotate in the direction of arrow A3. The angular setting at which the inertia member 327 rotates the latch member 345 from the home position to the latch position is smaller than the angle for home position-to-latch position rotation of the AHSA 305.

Therefore, even if the AHSA 305 is impacted for rotation in the direction of arrow B1, the latch member 345 restrains the AHSA 305 at the latch position. The behavior exhibited by the inertia latch when the AHSA 305 rotates in the direction of arrow A1 in reaction to restraint and collides again with the outer crash stop 313 is as described earlier.

If a great collision energy results from the rebound of the AHSA 305, the inertia member 327 receives a torque from the coil support 315 while the elastic body of the outer crash stop 313 is elastically deformed, no matter whether the inertia member 327 and latch member 345 return to their home positions, and the cooperative operation of the inertia member 327 and latch member 345 moves the engagement section 351 of the latch member 345 to the latch position to permit latching. If the collision energy is small, on the other hand, the AHSA 305 can stay within the retreat range.

The operation of the inertia latch has been described above. The latch member 345, which corresponds to the movable member 100, retains the magnet 361 and operates upon extraneous impact application to the magnetic disk drive. Further, the latch member 345 operates due to magnetic attraction between the iron strip of the AHSA 305 and the magnet 361. Those skilled in the art will appreciate that another magnet may be added to the AHSA 305 to let the latch member 345 operate due to a magnetic repulsive force that is exerted between the added magnet and magnet 361. Although the foregoing description deals with a ramp-based load/unload magnetic disk drive, the prevent invention can also be applied to a contact start/stop magnetic disk drive. If the retreat area is to be positioned within the inner non-recording area of the magnetic disk for a contact start/stop magnetic disk drive, the inner crash stop becomes a component for the inertia latch.

When the base 303 or cover is made of a ferromagnetic material, a bending moment oriented toward the base (downward) or toward the cover (upward) may arise in the latch member 345, thereby obstructing the smooth operation of the latch member 345.

Magnetic Latch

An embodiment of a magnetic latch, which is used as an actuator lock mechanism according to another embodiment of the present invention, will now be described with reference to FIGS. 9 through 11. The magnetic latch shown in FIGS. 9 through 11 is disclosed by Japanese Patent Laid-Open No. 302417/1998. FIG. 9 is a schematic plan view of a magnetic disk drive 400. A magnetic disk 401, which is used as an information recording medium, contains a recording area 403 for information storage and a non-recording area 405 in which a head/slider 411 is to be positioned while a read/write operation is stopped. The magnetic disk 401 rotates on a spindle shaft 407.

The magnetic disk drive 400 uses a contact start/stop method. A texture is formed in the non-recording area 405 and used as a retreat area for the head/slider 411. The magnetic disk drive 400 employs a magnetic latch to block an actuator assembly 409 from moving for the purpose of preventing the head/slider 411 from entering the recording area 403 upon extraneous impact application while the head/slider 411 is positioned in the non-recording area 405 with the rotation of the magnetic disk 401 stopped.

The actuator assembly 409 rotates on a pivot shaft 413 and places the head/slider 411 at a specified position on the magnetic disk 401. A magnet support 419 is mounted on a base 429 and positioned near the rear end of the actuator assembly 409 in a retreat position so that the magnet support 419 can turn on a provided latch shaft 423. The magnet support 419 corresponds to the movable member 100, which is described with reference to FIGS. 2(A) through 2(D), and retains a magnet 417. While the actuator assembly 409 is in a retreat position, the magnet 417 can magnetically attract an iron strip 415 that is provided for a part of the actuator assembly 409.

The magnet support 419 is also provided with a hole 425. A stationary pin 427, which penetrates through the hole 425, is mounted in the base 429. The coiled portion of a torsion coil spring 421 is inserted into the latch shaft 423. The torsion coil spring 421 has two arms. One arm is engaged with the stationary pin 427. The other arm is engaged with an end of the magnet support 419. The two arms of the torsion coil spring 421 are elastically deformed to generate an elastic force in a direction in which the interval between them increases, and engaged with the stationary pin 427 and the end of the magnet support 419.

The operation of the actuator lock mechanism will now be described with reference to FIGS. 10(A) through 10(C), which present enlarged views of the actuator lock mechanism shown in FIG. 9. FIG. 10(A) indicates that the actuator assembly 409 is rotating in the direction of arrow A and toward a retreat position. The figure also indicates that the iron strip 415 is still not magnetically attached to the magnet 417. Owing to the elastic force of the two arms of the torsion coil spring 421, the magnet support 419 can turn within a range permitted by edge point a of the hole 425 and the stationary pin 427. However, FIG. 10(A) shows that the magnet support 419 is stopped at a position at which edge point a of the hole 425 collides with the stationary pin 427.

FIG. 10(B) shows that the iron strip 415 is magnetically attached to the magnet 417 because the actuator assembly 409 continuously rotates. In the state shown in the figure, the magnet support 419 is torqued in the direction of arrow B because of the elastic force of the torsion coil spring 421. Thus, the actuator assembly 409 is placed in the retreat position and secured to the base 429. FIG. 10(C) shows that when an extraneous impact is applied to the magnetic disk drive 400 to move the actuator assembly 409 in the direction of arrow C while the actuator assembly 409 is placed in the retreat position and secured to the base 429 as indicated in FIG. 10(B), the magnet support 419 is rotating on the latch shaft 423 in the direction of arrow D until the stationary pin 427 abuts on edge point b of the hole 425.

In the above instance, the torsion coil spring 421 is elastically deformed due to the rotation of the magnet support 419 so that an elastic force, which resists the magnet support's rotation in the direction of arrow D, is imparted to the magnet support 419. A selection is made so that the magnetic attraction force exerted between the magnet 417 and iron strip 415 is greater than the force that is imparted to the magnet support 419 by the elastic force of the torsion coil spring 421. Therefore, when the actuator assembly 409 moves in the direction of arrow C upon impact force application, the iron strip 415 is magnetically attached to the magnet 417 until edge point b of the hole 425 collides with the stationary pin 427. The elastic force of the torsion coil spring 421 imparts a force resisting the actuator assembly's rotation in the direction of arrow C to the actuator assembly via the magnet support 419, magnet 417, and iron strip 415.

When the impact force further rotates the actuator assembly 409 in the direction of arrow C in opposition to an elastic force that is imparted to the magnet support 419 by the torsion coil spring 421, edge point b of the hole 425 collides with the stationary pin 24. The magnet support 419 then stops rotating because it can no longer rotate together with the actuator assembly 409. The rotation energy remaining in the actuator assembly 409 when edge point b of the hole 425 collides with the stationary pin 427 attenuates because it is absorbed by the elastically deformed torsion coil spring 421 while the magnet support 419 rotates within a range permitted by the intervals among the stationary pin 427 and edge points a and b of the hole 23. The magnetic attraction force exerted between the magnet 417 and iron strip 415 merely has to withstand the attenuated impact force. As a result, the impact force absorption capacities of the magnet 417 and iron strip 415 are increased.

In the magnetic latch described above, the magnet support must revert to the state shown in FIG. 10(A) due to the bias force of the torsion coil spring 421. Further, when an extraneous impact is applied, the magnet support must exhibit the elastic force and rotate together with the actuator assembly 409 in the direction of arrow D, which is shown in FIG. 10(C). If the base 429 or cover is made of a ferromagnetic material, an attraction force oriented toward the base (downward) or toward the cover (upward) arises in the magnet 417. A bending moment, which affects the operation of the latch shaft 423, then arises in the magnet support 419 and obstructs its smooth operation. Therefore, beneficial effects are produced when the influence of the bending moment is lessened by providing a cut in a portion of the base 429 or cover, which includes a range over which the orthogonal projection of the magnet 417 onto the base 429 or cover moves according to the rotation of the magnet support 419.

FIG. 11 illustrates an embodiment of a magnetic latch in which the magnet 417 linearly moves. A rod 431 is inserted through a through-hole in a support member 435 that is secured to the base 429. The magnet 417 is mounted on one end of the rod 431. A bolt 437 is provided for the other end of the rod 431. The bolt 437 is fastened to the rod 431 in such a manner that a compression coil spring 433 is compressed between the support member 435 and bolt 437. Therefore, the elastic force of the compression coil spring 433 applies a force to the magnet 417 via the rod 431. This force is oriented in the direction of arrow F. When an extraneous impact force is applied, the compression coil spring 433 absorbs the impact energy in the same manner as for the embodiment shown in FIGS. 9, 10(A), 10(B), and 10(C).

BRIEF SUMMARY OF THE INVENTION

The present invention applies to a rotating disk storage device having a base or cover that contains a magnetically attractive magnetic section. According to one aspect of the invention, a rotating disk storage device comprises a base containing a magnetic section, a cover to be installed over the base, a rotating disk recording medium mounted on the base in a rotatable manner, an actuator assembly for positioning a head over the rotating disk recording medium, and an actuator lock mechanism containing a movable member for retaining a magnet. Further, the area demarcated by the orthogonal projection of the magnet onto the magnetic section is provided with a cut.

The magnetically attractive magnetic section is made of a ferromagnetic material such as iron, nickel, or cobalt. The ferromagnetic material is contrary to aluminum or other nonmagnetic material that is not magnetically attractive. The cover is installed over the base to serve as a housing or casing that encloses the storage device. To implement the idea of the present invention, therefore, it is not always necessary to enclose the storage device with two materials such as a base and a cover. The present invention covers all items that perform the same functions as the base and cover. The base or cover may contain a nonmagnetic section that is formed by a nonmagnetic material, which is not magnetically attractive. The present invention is applicable to a case where the magnetic attraction force exerted between a magnet and base or cover affects the operation of the movable member.

The orthogonal projection of the magnet onto the base or cover demarcates a certain area of the base or cover. The area demarcated by the orthogonal projection covers the whole track of the magnet that moves in accordance with the motion of the movable member. The cut may be provided for a magnetic section area that coincides with the area demarcated by the orthogonal projection of the magnet. Further, the cut may be provided for a magnetic section area that corresponds to a part of the area demarcated by the orthogonal projection of the magnet. Furthermore, the cut may be provided for a magnetic section area that includes and is larger than the area demarcated by the orthogonal projection of the magnet.

The actuator lock mechanism prevents the actuator assembly from moving while it is in its retreat position. The actuator lock mechanism may include a function for restraining the actuator assembly from moving away from its retreat position when a strong impact is externally applied to the storage device. Further, the actuator lock mechanism may include a function for preventing the actuator assembly from colliding with and rebounding from a crash stop when the actuator assembly gets out of control due to a control failure or retreats upon sudden power shutoff. Furthermore, the actuator lock mechanism may include a function for retaining the actuator assembly with such a force that the actuator assembly separates from the actuator lock mechanism when a driving force is applied by a voice coil motor.

The present invention can be applied to a load/unload storage device, which uses a ramp as the retreat for the head, and to a contact start/stop storage device, which uses a part of a recording medium. The movable member may be a restraint member that directly restrains the actuator or an auxiliary member that provides assistance to the operation of the restraint member. The movable member is operated by a magnetic attraction force or magnetic repulsive force exerted between the magnet and the other member. However, the movable member may also be operated by an extraneous impact or a spring or other bias mechanisms.

The actuator lock mechanism may be an eddy-current latch, inertia latch, magnetic latch, or other similar latch. The eddy-current latch may be any latch that uses a force exerted between the magnet and an eddy current generated on a recording medium. The inertia latch may be any latch containing a member that operates in response to an extraneous impact. The magnetic latch may be any latch in which a magnet attracts and secures the actuator assembly.

The present invention provides a smooth operation of a magnet-based actuator lock mechanism in a rotating disk storage device that has a base or cover containing a magnetically attractive magnetic section.

DETAILED DESCRIPTION OF THE INVENTION

Figure 1:
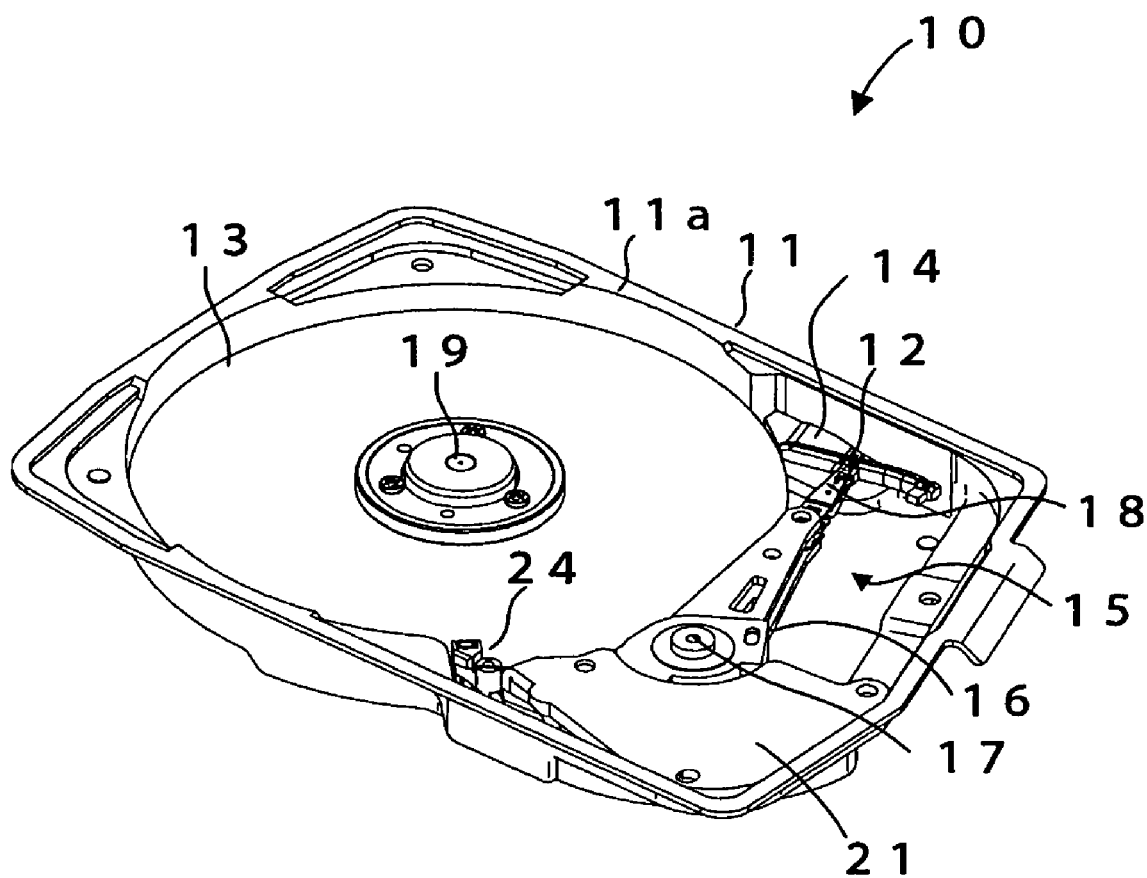
FIG. 1 is a perspective view of a magnetic disk drive.

Embodiments of the present invention will now be described with reference to a magnetic disk drive, which is an example of a rotating disk storage device according to the present invention. Within this document, like reference numerals refer to like elements in various drawings.

Figure 2:
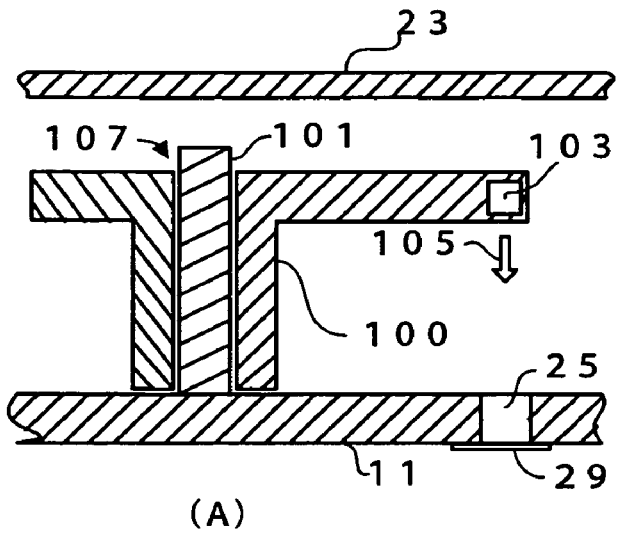
FIGS. 2(A) through 2(D) illustrate the principles of the present invention.
Figure 2:
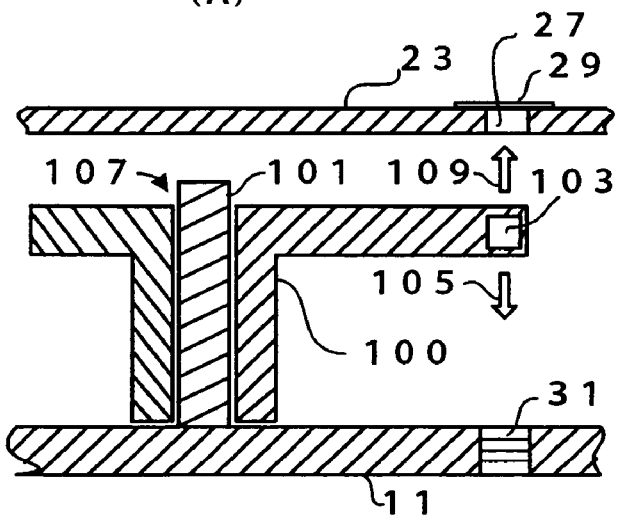
Figure 2:
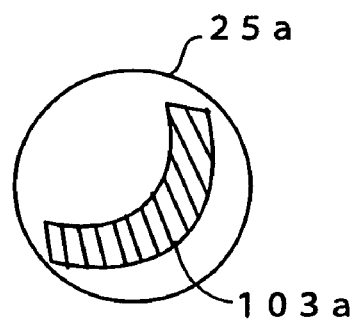
Figure 2:
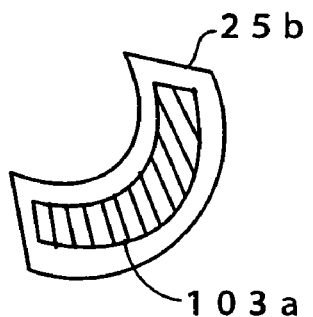
Figure 3:
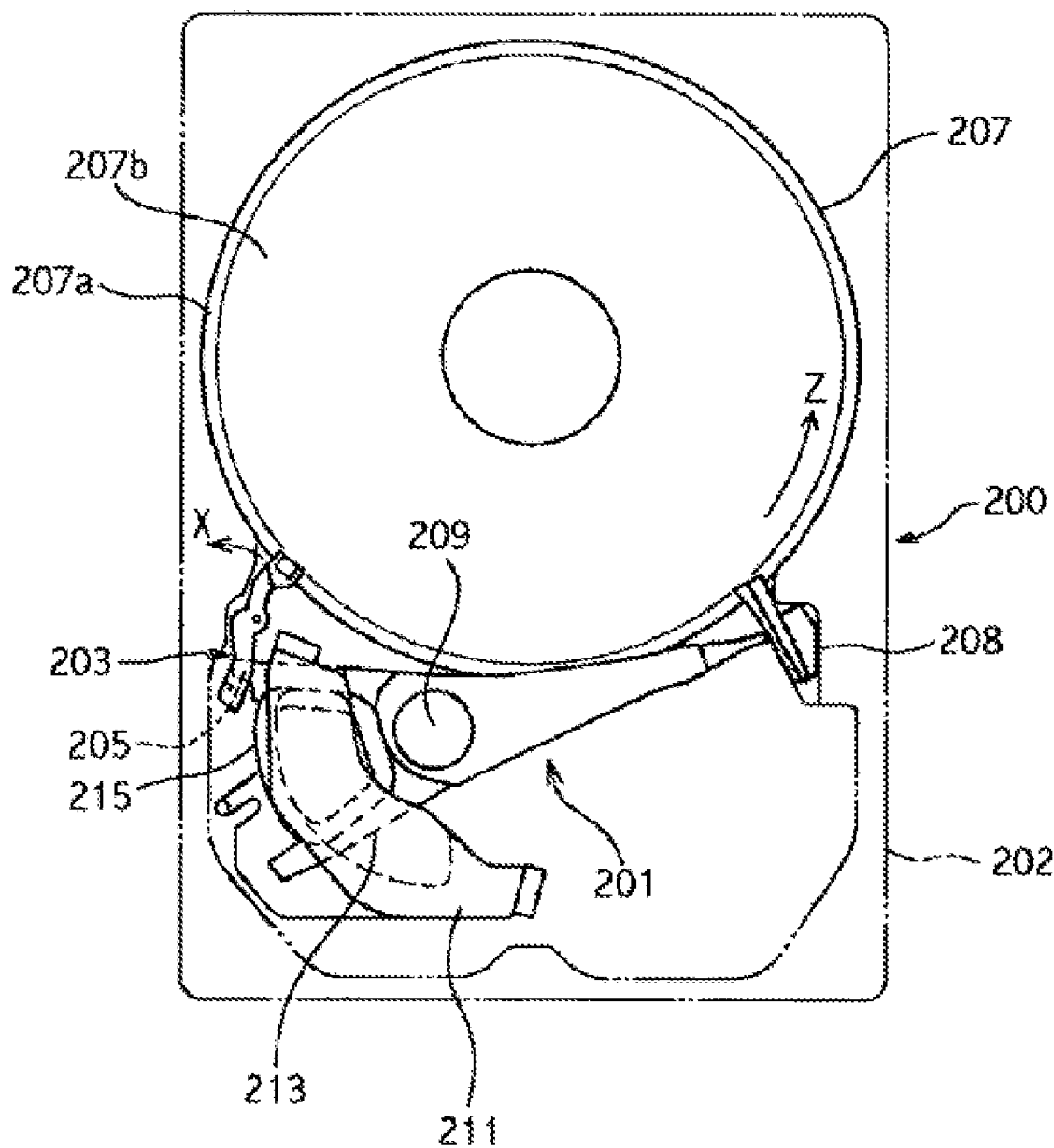
FIG. 3 illustrates an embodiment of a conventional eddy-current latch.
Figure 4:
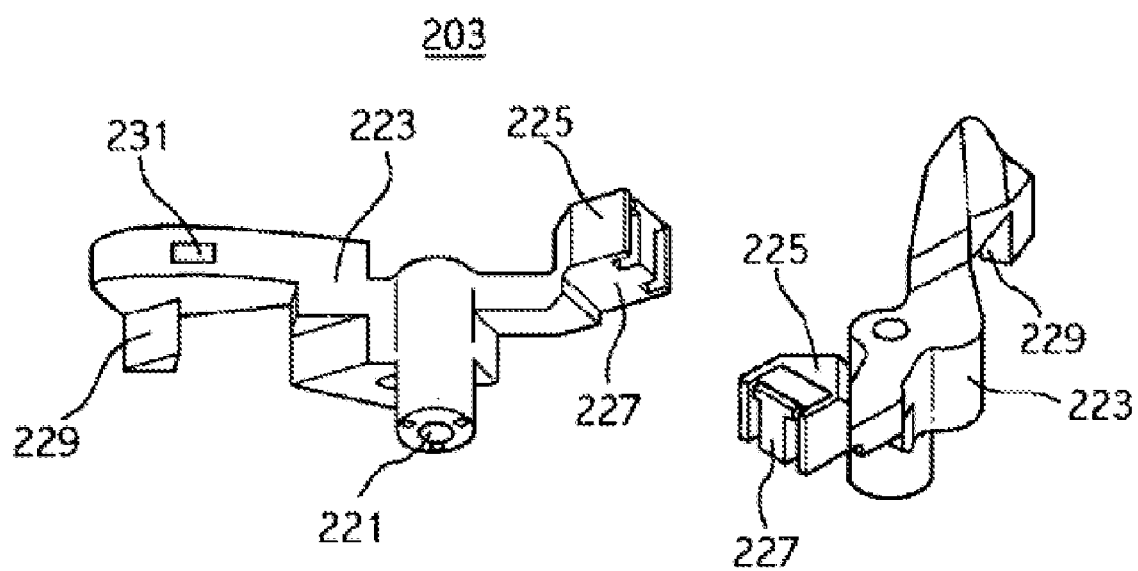
FIG. 4 illustrates an embodiment of a conventional eddy-current latch.
Figure 5:
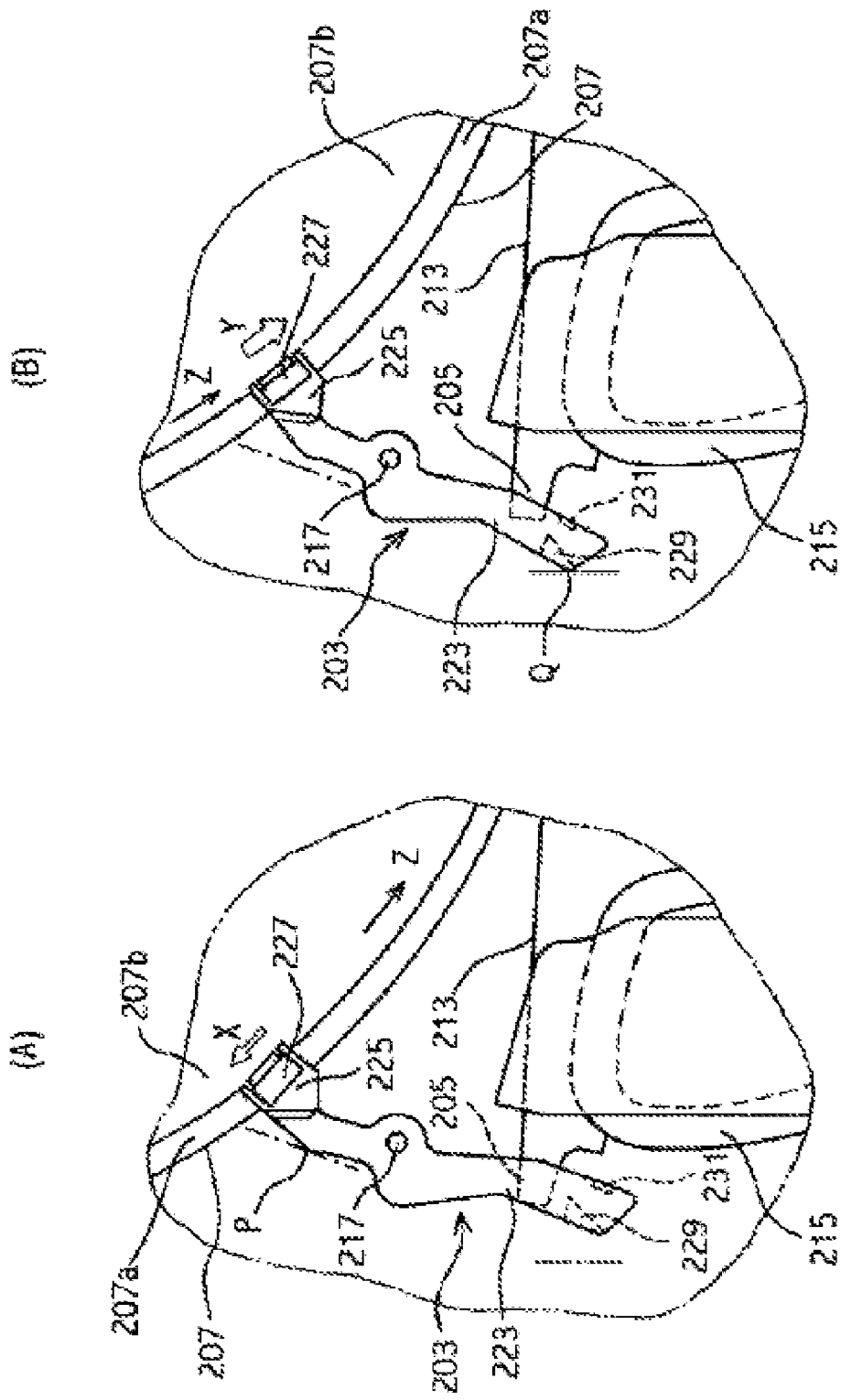
FIGS. 5(A) and 5(B) illustrate an embodiment of a conventional eddy-current latch.

The principles of the present invention, which are common to the various actuator lock mechanisms, will now be described with reference to FIGS. 2(A) through 2(D). FIG. 2(A) schematically shows a cross section of a movable member 100 that is used for the actuator lock mechanism of the magnetic disk drive 10 having the base 11, which is formed by a ferromagnetic material, and the cover 23, which is formed by a nonmagnetic material. As described later, the movable member 100, which retains a magnet 103, exercises various functions in each actuator lock mechanism. The movable member 100 is configured to turn on a shaft 101 freely in a horizontal direction (in a direction parallel to the surface of the magnetic disk 13) with a central shaft hole 107 installed over the shaft 101, which is provided for the base 11. Owing to an attractive force exerted between the magnet 103 and an actuator assembly metal portion and a torque exerted between the magnet 103 and an eddy current generated on the magnetic disk, the magnet 103 imparts a horizontal torque to the movable member 100.

In a general operation of the movable member, the movable member is at a predetermined position due to magnetic attraction/repulsion or a bias force generated, for instance, by a spring before a torque is generated for the magnet, and the movable member rotates when the torque generated for the magnet is greater than the bias force. The scope of the present invention embraces a case where the movable member is operated merely by a force generated by the magnet or by the force of inertia. The shaft hole 107 in the movable member 100 forms a slide bearing for the shaft 101. However, as far as a horizontal torque is exerted on the magnet 103, the movable member 100 can smoothly turn due to the slide bearing action of the shaft 101 and shaft hole 107. If the base 11 is formed by a ferromagnetic material, however, a magnetic attraction force is generated between the magnet 103 and the base 11 in addition to a torque. As a result, a downward bending moment, which is indicated by arrow 105, is imparted to the movable member 100.

The bending moment works so that the center of the shaft hole 107 inclines in relation to the shaft 101. As a result, the contact between the shaft 101 and the inner surface of the shaft hole 107 tends to change from planar contact to line contact, thereby obstructing a smooth slide bearing action. The smaller the torque that is imparted to the movable member 100 by the magnet 103 and the greater the bending moment becomes, the higher the possibility that a smooth operation of the movable member 100 may be obstructed by the bending moment becomes. In embodiments of the present invention, a cut 25 formed by cutting a part of the base 11 is provided for a magnetic section area that is demarcated by the orthogonal projection of the magnet 103 onto the base 11. The cut 25 penetrates through the inner and outer surfaces of the base 11.

FIG. 2(C) is a plan view illustrating the relationship between an orthogonal projection 103a of the magnet 103 and a cut 25a, which is an example of the cut 25. The orthogonal projection 103a is a shadow of the magnet 103 that is projected onto the base 11 when parallel light rays perpendicular to the base 11 are incident on the rear (upper side in FIG. 2(A)) of the magnet 103. In this case, the outer shape of the movable member 100, which retains the magnet 103, is ignored. Since the magnet 103 turns on the shaft 101 in accordance with the operation of the movable member 100, the orthogonal projection 103a covers the entire circular motion range of the magnet. The cut 25a is formed by cutting off a circular area of the base 11, which contains the whole orthogonal projection 103a. The formation of such a circular, rectangular, or otherwise shaped cut 25 is easily accomplished for increased convenience. If the cut 25 is shaped like a circle, the concentration of stress can be avoided. Therefore, the use of such a circular cut is suitable for a case where the material for the base is thin. In the example shown in FIG. 2(D), on the other hand, a cut 25b is formed along the magnet track. When the area of the cut is reduced in this manner, the cut can be tightly closed with ease.

When the base 11 is provided with the cut 25, the magnetic attraction force exerted between the base 11 and magnet 103 decreases. The bending moment can then be reduced to the extent that the operation of the movable member 100 will not be obstructed. The area of the cut 25 may be smaller than an area that is demarcated by the orthogonal projection of the magnet 103 onto the base 11. A hermetically sealed structure is provided for the HDA by covering the cut 25 with a non-magnetic sealing material 29 to which a non-gas-emitting adhesive is applied. For example, double-faced adhesive tape with polyethylene terephthalate (PET) may be used as the sealing material.

In the present embodiments, the base 11 need not always be formed entirely by a ferromagnetic material. The present invention is applicable to a case where the area demarcated by the orthogonal projection of the magnet 103 onto the base 11 is formed by a ferromagnetic material. For example, the base may be such that only the bottom of the mounting surface for an element of the magnetic disk drive is made of steel while the circumference is made of synthetic resin. For explanation purposes, FIG. 2(A) illustrates an example in which the movable member 100 turns, causing the magnet 103 to arc on the shaft 101. However, the present invention can also be applied to a configuration in which the movable member 100 performs a linear motion parallel to or nearly parallel to the base 11, causing the magnet 103 to move along a straight line.

FIG. 2(B) differs from FIG. 2(A) in that the cover 23 is made of a ferromagnetic material and that the cut 25 in the base 11 is covered by a filler 31. If the cover 23 is made of a ferromagnetic material, an upward attraction force indicated by arrow 109 is generated for the magnet so that the difference between such an upward attraction force and a downward attraction force gives rise to a bending moment, which is oriented in either direction and exerted on the bearing 101. If the magnitude of the upward attraction force 109 exerted on the magnet 103 balances with that of the downward attraction force 105, the bending moment is not exerted on the movable member 100. To attain a proper balance, however, it is necessary to ensure that the distance between the magnet 103 and base 11 is equal to the distance between the magnet 103 and cover 23. This restricts the degree of freedom in the design of the magnetic disk drive 10. When the cover 23 is also provided with a cut 27 as is the case with the base 11, the smooth operation of the movable member can be assured by lessening the influence of the bending moment without restricting the degree of freedom in design. The cut 27 is covered with the nonmagnetic sealing material 29.

As is the case with the base 11, the size, shape, and other physical characteristics of the cut 27 can be determined in relation to the orthogonal projection of the magnet 103 onto the cover 23. Those skilled in the art will appreciate that the smooth operation of the movable member 100 can be similarly assured by providing the cut 27 even when only the cover 23 is made of a ferromagnetic material. The filler 31 for covering the cut 25 in the base 11 may be selected from among various nonmagnetic materials. For example, synthetic resin may be used as the filler 31. Either or both of the filler 31 and sealing material 29 may be used to cover the cut.

As described with reference to FIGS. 2(A) through 2(D), the base 202 or cover shown in FIGS. 3, 4, 5(A) and 5(B) is provided with a cut within the range over which the orthogonal projection of the eddy-current magnet 227 onto the base 202 or cover moves due to latch member turning. Further, when the bending moment is reduced by covering the cut with a nonmagnetic sealing material or filler, the smooth operation of the latch member 203 can be assured. When obtaining the bias force that is exerted in direction X with the bias magnet 231 embedded in the latch arm 223, the bias magnet 231 can be provided with a cut, which corresponds in position to the base or cover, in order to assure the smooth operation of the latch member 203.

If the bias force for rotating the latch member 203 in direction X and the force generated by the eddy-current magnet 227 for rotating the latch member 203 in direction Y are greater than necessary, the rotation of the magnetic disk 207 is obstructed with an extra load imposed on the spindle motor. Therefore, the above forces cannot be increased to a considerable extent. If the latch member 203 has to smoothly operate even when the torque is small, the bending moment generated by the eddy-current magnet 227 is likely to obstruct the smooth operation of the latch member 203. Therefore, a desired effect is achieved when the base or cover is provided with a cut.

Figure 6:
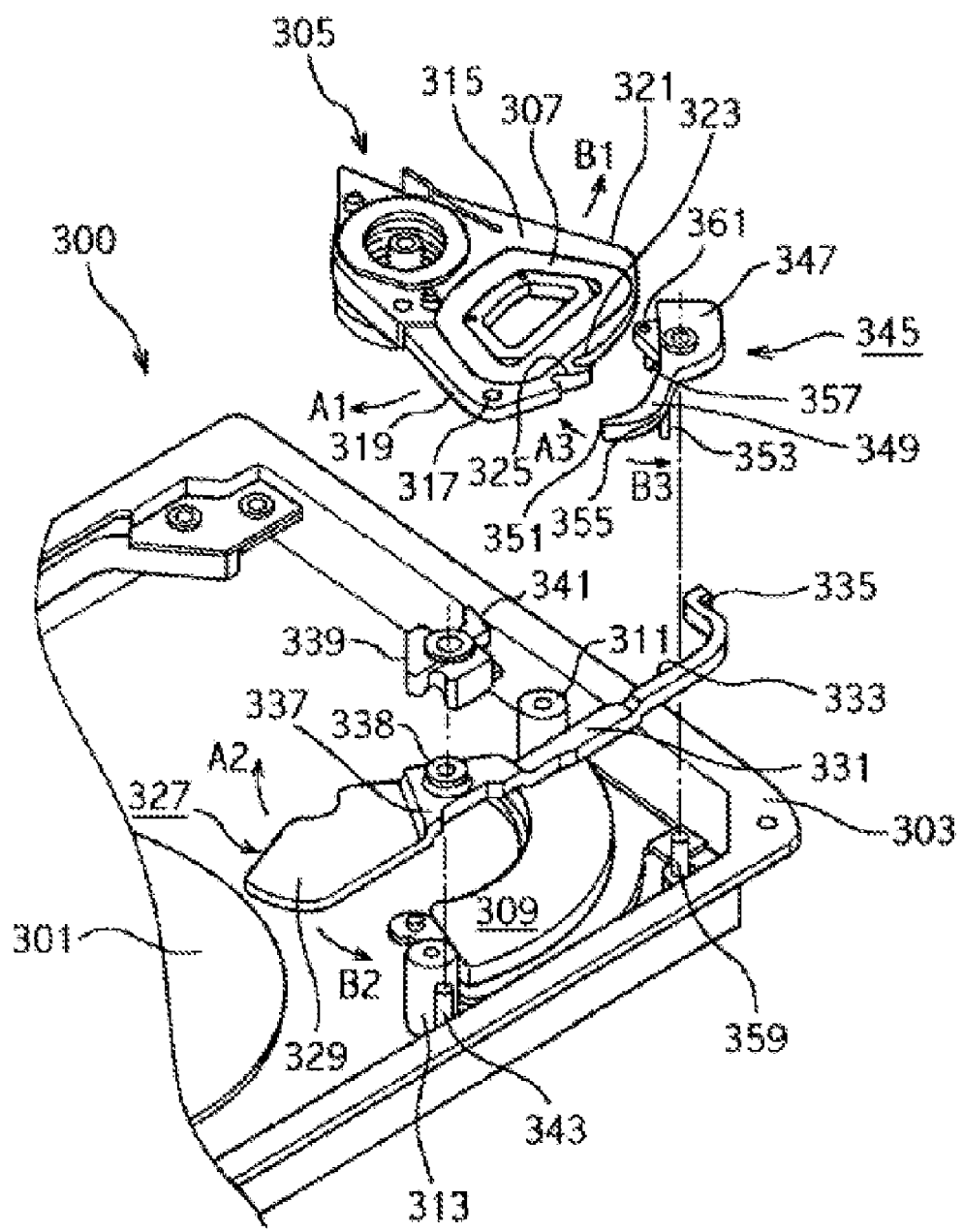
FIG. 6 illustrates an embodiment of a conventional inertia latch.
Figure 7:
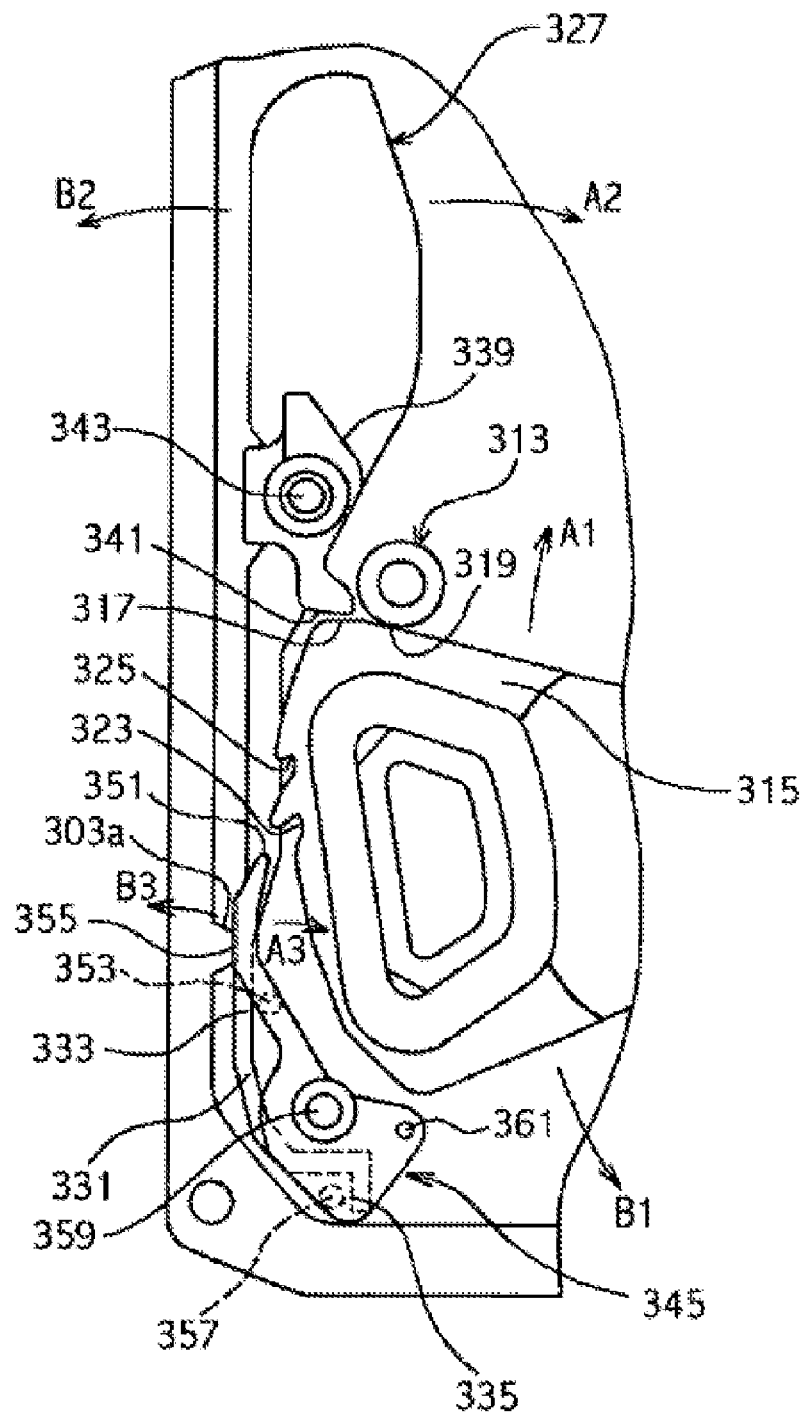
FIG. 7 illustrates an embodiment of a conventional inertia latch.
Figure 8:
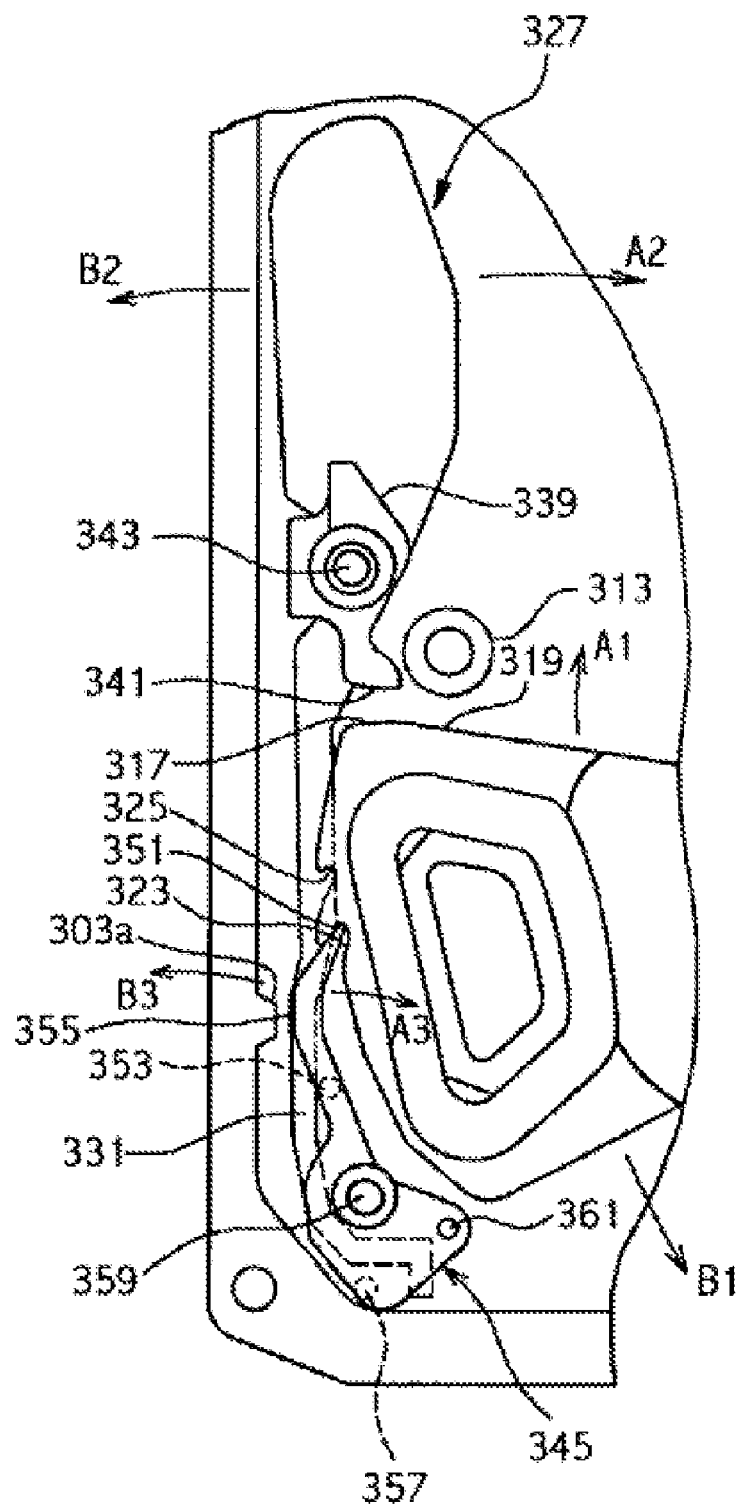
FIG. 8 illustrates an embodiment of a conventional inertia latch according to the present invention.
Figure 9:
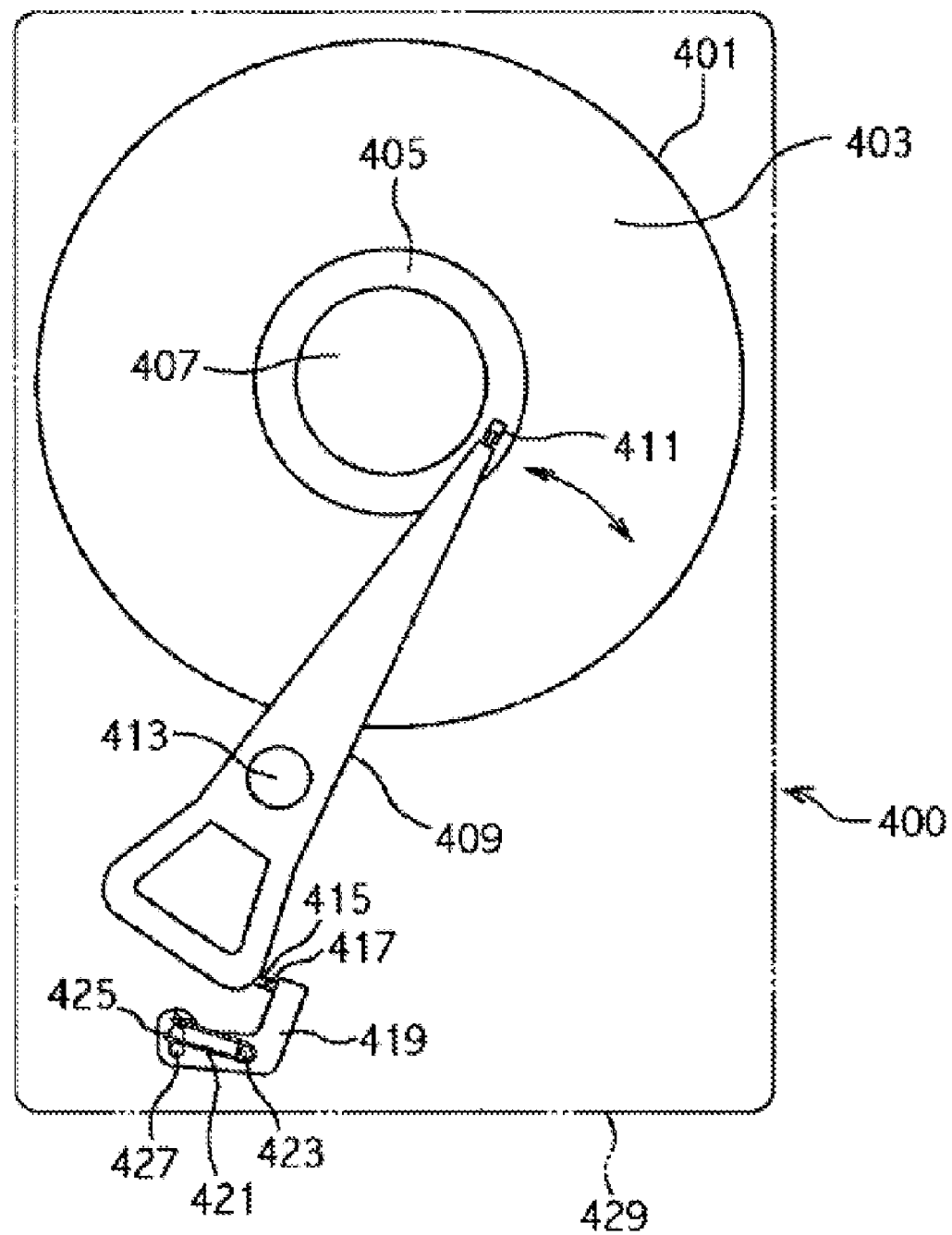
FIG. 9 illustrates an embodiment of a conventional magnetic latch.
Figure 10:
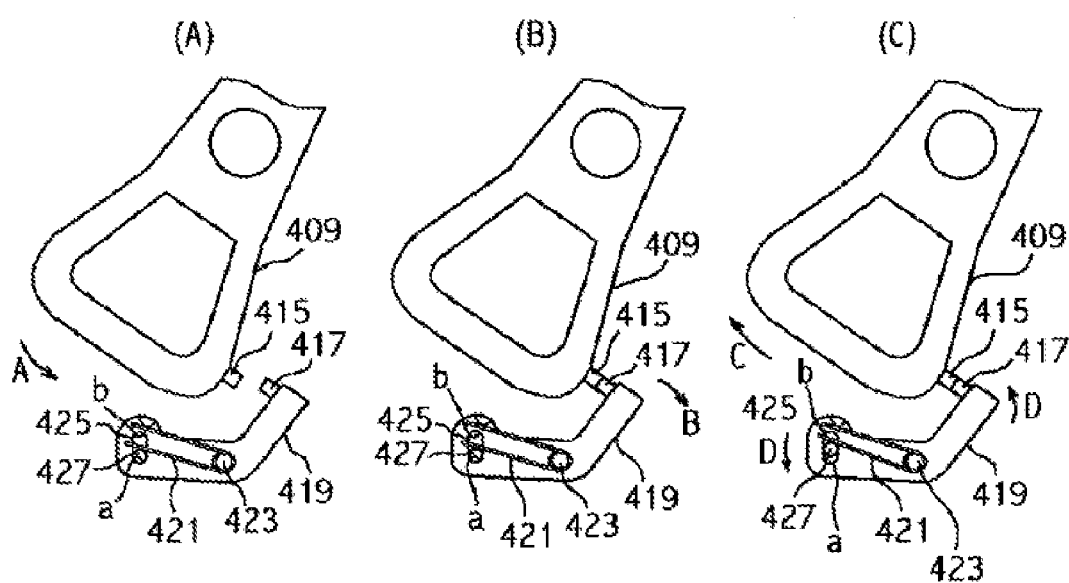
FIGS. 10(A), 10(B), and 10(C) illustrate an embodiment of a conventional magnetic latch.

As described with reference to FIGS. 2(A) through 2(D), a cut is therefore provided in a portion of the base 303 shown in FIG. 6 or cover, which includes a range over which the orthogonal projection of the magnet 361 onto the base 303 or cover moves according to the rotation of the latch member 345. This reduces the influence of the bending moment, which is invoked by the magnet 361. Particularly, it is demanded that the moment of inertia of the latch member 345 be reduced for inertia latch function implementation purposes, and the mounting space for the base 303 is limited. Under such circumstances, the magnet 361 needs to be small in size. When the magnet 361 is small, the torque for the latch member 345 cannot be significantly increased. It means that a malfunction may be caused by a slight torque. Therefore, the operation of the inertia latch can be assured by providing the base 303 or cover with a cut.

Figure 11:
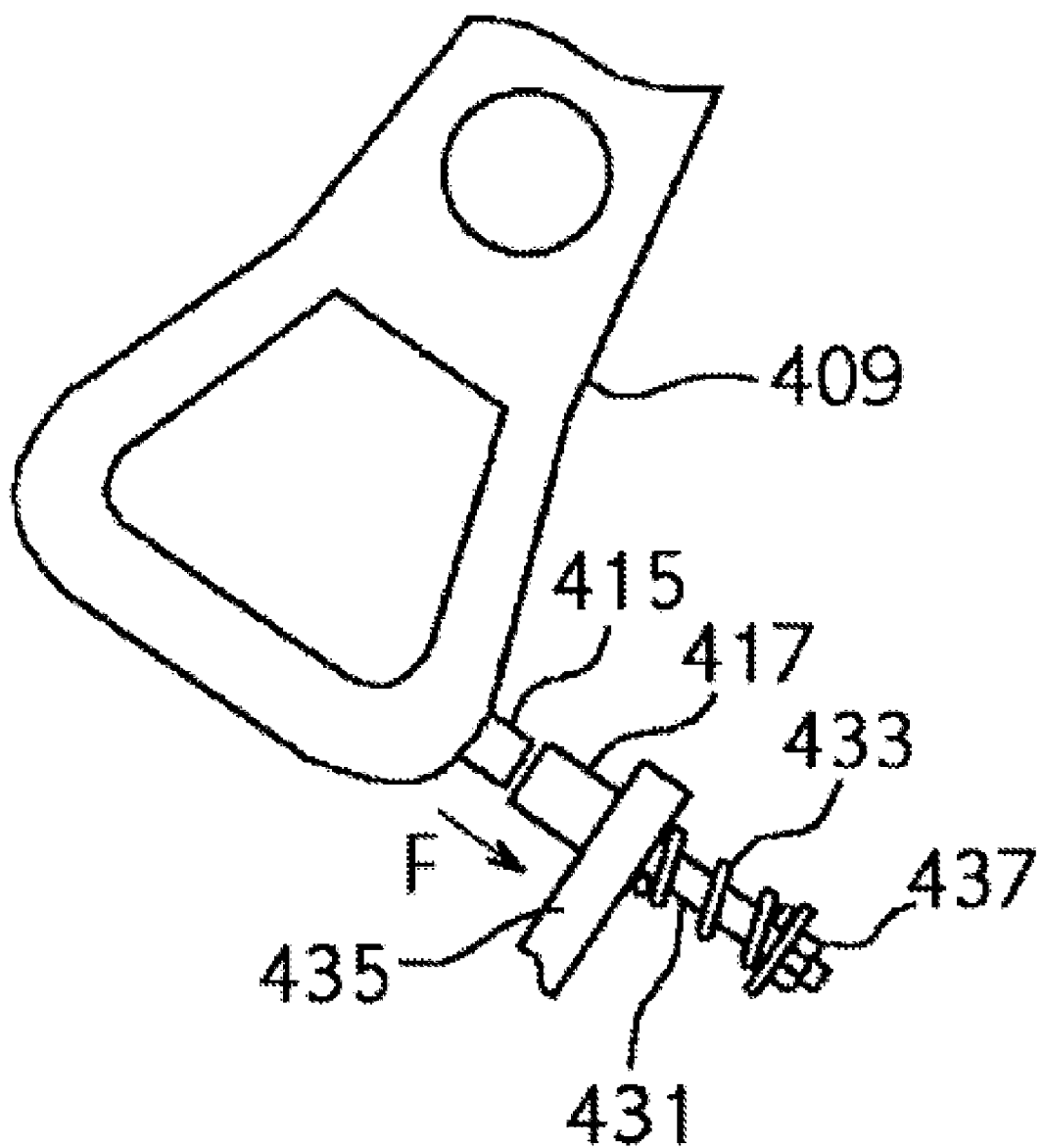
FIG. 11 illustrates an embodiment of a conventional magnetic latch.

In the present embodiment, the rod 431 shown in FIG. 11 corresponds to the movable member 100, which is described with reference to FIGS. 2(A) through 2(D), and retains the magnet 417. It is necessary that the bias force of the compression coil spring or the torque generated in the impacted actuator assembly 409 move the rod 431 smoothly in axial direction. If the base or cover is made of a ferromagnetic material, an attraction force oriented toward the base (downward) or toward the cover (upward) is exerted on the magnet 417. A bending moment is then exerted on the rod 431 so that the rod 431 may fail to smoothly slide within the through-hole in the support member 435. Therefore, beneficial effects are produced when the magnet 417 lessens the influence of the bending moment, which works on the through-hole in the support member 435, by providing a cut in a portion of the base or cover, which includes a range over which the orthogonal projection of the magnet 417 onto the base or cover moves according to the linear motion of the support member 435.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A rotating disk storage device comprising:
   a base containing a magnetic section;
   a cover coupled to said base;
   a rotating disk recording medium mounted on said base in a rotatable manner;
   an actuator assembly to position a head over said rotating disk recording medium; and
   an actuator lock mechanism containing a movable member to retain a magnet;
   wherein an area demarcated by an orthogonal projection of said magnet onto said magnetic section of said base is provided with an aperture for decreasing the magnetic attraction force between the base and the magnet;
   wherein the area demarcated by the orthogonal projection covers the whole track of the magnet that moves in accordance with the motion of the movable member.

2. The rotating disk storage device according to claim 1, wherein said movable member is operated by a force exerted between said magnet and an eddy current generated on said rotating disk recording medium.

3. The rotating disk storage device according to claim 1, wherein said movable member operates together with said actuator assembly while said magnet is attracted to said actuator assembly.

4. The rotating disk storage device according to claim 1, wherein said movable member turns on a shaft that is coupled to said base.

5. The rotating disk storage device according to claim 1, wherein said movable member performs a linear operation in a direction parallel to the surface of said base.

6. The rotating disk storage device according to claim 1, wherein said actuator lock mechanism restrains said actuator assembly so that said head does not become displaced from a predetermined position when an impact is exerted on said rotating disk storage device.

7. The rotating disk storage device according to claim 1, further comprising a crash stop, wherein said actuator lock mechanism restrains a rebound that may occur after said actuator assembly collides with said crash stop.

8. The rotating disk storage device according to claim 1, wherein said actuator lock mechanism is configured such that the magnet for said movable member attracts and restrains said actuator assembly.

9. The rotating disk storage device according to claim 1, wherein said aperture is larger than an area demarcated by the orthogonal projection of said magnet.

10. The rotating disk storage device according to claim 1, wherein said aperture is shaped as a circle.

11. The rotating disk storage device according to claim 1, wherein said base is formed by pressing a steel sheet.

12. The rotating disk storage device according to claim 1, wherein said actuator lock mechanism comprises an eddy-current latch.

* * * * *

UNITED STATES PATENT AND TRADEMARK OFFICE
CERTIFICATE OF CORRECTION

| | |
|---|---|
| PATENT NO. | : 7,606,004 B2 |
| APPLICATION NO. | : 11/142065 |
| DATED | : October 20, 2009 |
| INVENTOR(S) | : Tsuda et al. |

It is certified that error appears in the above-identified patent and that said Letters Patent is hereby corrected as shown below:

Title page, Column 1, Item (75) Inventors, please delete "Matsuro" and insert -- Mutsuro --

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,606,004 B2 Page 1 of 1
APPLICATION NO. : 11/142065
DATED : October 20, 2009
INVENTOR(S) : Tsuda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1125 days.

Signed and Sealed this

Fifth Day of October, 2010

David J. Kappos
*Director of the United States Patent and Trademark Office*